*US012238370B2*

(12) United States Patent
Stockhammer et al.

(10) Patent No.: US 12,238,370 B2
(45) Date of Patent: Feb. 25, 2025

(54) DETERMINATION OF AVAILABILITY OF CHUNKS OF DATA FOR NETWORK STREAMING MEDIA DATA

(71) Applicant: QUALCOMM Incorporated, San Diego, CA (US)

(72) Inventors: Thomas Stockhammer, Bergen (DE); Ece Ozturk, Munich (DE)

(73) Assignee: QUALCOMM INCORPORATED, San Diego, CA (US)

( * ) Notice: Subject to any disclaimer, the term of this patent is extended or adjusted under 35 U.S.C. 154(b) by 8 days.

(21) Appl. No.: 17/211,641

(22) Filed: Mar. 24, 2021

(65) Prior Publication Data

US 2021/0306703 A1 Sep. 30, 2021

Related U.S. Application Data

(60) Provisional application No. 62/994,725, filed on Mar. 25, 2020.

(51) Int. Cl.
*H04N 21/44* (2011.01)
*H04N 21/43* (2011.01)
(Continued)

(52) U.S. Cl.
CPC ..... *H04N 21/44008* (2013.01); *H04N 21/4305* (2013.01); *H04N 21/4383* (2013.01); *H04N 21/84* (2013.01)

(58) Field of Classification Search
CPC ......... H04N 21/44008; H04N 21/4305; H04N 21/4383; H04N 21/84
(Continued)

(56) References Cited

U.S. PATENT DOCUMENTS 9,118,744 B2    8/2015  Nagaraj et al.
11,647,251 B2 *  5/2023  Lohmar ............. H04N 21/4402
                                          709/231
(Continued)

FOREIGN PATENT DOCUMENTS

WO    2014022234 A1   2/2014
WO    2018071149 A1   4/2018
WO    2019011430 A1   1/2019

OTHER PUBLICATIONS

Draft Text of ISO/IEC 23009-1 4th Edition DAM 1 CMAF Support, Events Processing Model and Other Extensions, 129. MPEG Meeting, Jan. 13, 2020-Jan. 17, 2020, Brussels, (Motion Picture Expert Group or ISO/IEC JTC1/SC29/WG11), No. n19058, Feb. 26, 2020 (Feb. 26, 2020) (Year: 2020).*

(Continued)

*Primary Examiner* — Alfonso Castro
(74) *Attorney, Agent, or Firm* — Shumaker & Sieffert, P.A.

(57) ABSTRACT

An example device for transporting media data includes: a memory configured to store media data; and one or more processors implemented in circuitry and configured to: determine that a manifest file for a media presentation includes data representing a delta time value for a resynchronization element of a segment of the media presentation; determine a multiple of the delta time value; determine a number of chunks of the segment that are currently available for retrieval using the multiple of the delta time value; send a request to a server device for the chunks of the segment that are currently available, wherein the request omits chunks of the segment that are not currently available; and store data of chunks received in response to the request in the memory.

24 Claims, 12 Drawing Sheets

(51) Int. Cl.
 H04N 21/438 (2011.01)
 H04N 21/84 (2011.01)
(58) Field of Classification Search
 USPC .......................................................... 725/145
 See application file for complete search history.

(56) References Cited

U.S. PATENT DOCUMENTS

| | | | |
|---|---|---|---|
| 2002/0010917 | A1 | 1/2002 | Srikantan et al. |
| 2013/0007223 | A1* | 1/2013 | Luby .............. H04N 21/234327 709/219 |
| 2014/0222962 | A1* | 8/2014 | Mao ...................... H04L 65/403 709/219 |
| 2016/0253737 | A1 | 9/2016 | Chang et al. |
| 2016/0261665 | A1 | 9/2016 | Stockhammer et al. |
| 2016/0316235 | A1 | 10/2016 | Van Veldhuisen |
| 2017/0201761 | A1 | 7/2017 | Walker et al. |
| 2018/0035176 | A1* | 2/2018 | Stockhammer .... H04N 21/8455 |
| 2018/0103271 | A1 | 4/2018 | Wang et al. |
| 2018/0367591 | A1 | 12/2018 | Alm et al. |
| 2019/0313147 | A1 | 10/2019 | Cava et al. |
| 2019/0342356 | A1 | 11/2019 | Thomas et al. |
| 2019/0349629 | A1 | 11/2019 | Stockhammer |
| 2021/0274266 | A1 | 9/2021 | Lohmar et al. |

OTHER PUBLICATIONS

Digital Video Broadcasting (Dvb); MPEG-DASH Profile for Transport of ISO BMFF Based DVB Services over IP Based Networks, DVB Document A168, Oct. 2019, 132 pages (Year: 2019).*
Abdelhak Bentaleb, Christian Timmerer, Ali C. Begen and Roger Zimmermann, "Bandwidth prediction in low-latency chunked streaming", in Proc. ACM NOSSDAV, Amherst, MA Jun. 2019 (Year: 2019).*
N. Bouzakaria, C. Concolato, and J. Le Feuvre. 2014. Overhead and performance of low latency live streaming using MPEG-DASH . In IISA 2014, The 5th International Conference on Information, Intelligence, Systems and Applications. 92-97 (Year: 2014).*
"Draft Text of ISO/IEC 23009-1 4th Edition DAM 1 CMAF Support, Events Processing Model and Other Extensions", 129. MPEG Meeting, Jan. 13, 2020-Jan. 17, 2020, Brussels, (Motion Picture Expert Group or ISO/IEC JTC1/SC29/WG11), No. n19058, Feb. 26, 2020 (Feb. 26, 2020), XP030285347, Retrieved from the Internet: URL:http://phenix.int-evry.fr/mpeg/doc_end_user/documents/129_Brussels/wg11/w19058.zip SC29WG11_N19058-rev1.docx [retrieved on Feb. 29, 2020], 44 pages.
ETSI TS 103 285, "Digital Video Broadcasting (DVB); MPEG-DASH Profile for Transport of ISO BMFF Based DVB Services over IP Based Networks", ETSI TS 103 285, v1.1.1, European Telecommunications Standards Institute, May 2015, 72 pages.
ETSI TS 103 285, "Digital Video Broadcasting (DVB); MPEG-DASH Profile for Transport of ISO BMFF Based DVB Services over IP Based Networks", ETSI TS 103 285, V1.3.1, Feb. 2020, 130 pages.

Fielding R., et al., "Hypertext Transfer Protocol—HTTP/1.1", Network Working Group, Request for Comments, RFC 2616, Standards Track, Jun. 1999, pp. 1-114.
"Guidelines for Implementation: DASH-IF Interoperability Points", Version 4.0, DASH Industry Forum, Dec. 12, 2016, 168 pages.
International Search Report and Written Opinion—PCT/US2021/024183—ISA/EPO—Jun. 17, 2021, 12 pages.
ISO/IEC 14496-12: "Information Technology—Coding of Audio-Visual Objects—Part 12: ISO Base Media File Format", 5th Edition, Dec. 15, 2015, 248 Pages.
ISO/IEC FDIS 23009-1:2019(E): "Information Technology—Dynamic Adaptive Streaming Over HTTP (Dash)—Part 1: Media Presentation Description and Segment Formats", 2019, 295 Pages.
ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.
Paila T., et al., "FLUTE—File Delivery Over Unidirectional Transport", FLUTE—File Delivery over Unidirectional Transport, rfc6726.txt, Internet Engineering Task Force (IETF), Standard Track, Internet Society (ISOC) 4, Rue Des Falaises CH- 1205 Geneva, Switzerland, Nov. 6, 2012 (Nov. 6, 2012), XP015086468, pp. 1-46, http://tools.ietf.org/html/rfc6726, [retrieved on Nov. 6, 2012], p. 3, line 30—p. 27, line 12.
"Potential Improvement for ISO/IEC 23009-1 4th Edition DAM 1 CMAF Support, Events Processing Model and Other Extensions", ISO/IEC JTC 1/SC 29/WG 11, Coding of Moving Pictures and Audio, Jul. 14, 2020, 63 pages.
Stockhammer T (Qualcomm)., et al., "[DASH] Random Access to Segments (Resync)", 128. MPEG Meeting, Oct. 7, 2019-Oct. 11, 2019, Geneva, (Motion Picture Expert Group Or ISO/IEC JTC1/SC29/WG11), No. m50975, Oct. 5, 2019 (Oct. 5, 2019), XP030221479, 15 Pages, Retrieved from the Internet: URL:http://phenix.int-evry.fr/mpeg/doc_end_user/documents/128_Geneva/wg11/m50975-v2-m50975-Random-Access-r1.zip m50975-Random-Access-1.docx [retrieved on Oct. 5, 2019], 15 pages.
"Digital Video Broadcasting (DVB); MPEG-DASH Profile for Transport of ISO BMFF Based DVB Services over IP Based Networks", DVB Document A168, Oct. 2019, 132 pages.
"Digital Video Broadcasting (Dvb); MPEG-DASH Profile for Transport of ISO BMFF Based DVB Services over IP Based Networks", ETSI Technical Specification, European Telecommunications Standards Institute (ETSI), 650, Route Des Lucioles; F-06921 Sophia-Antipolis ; France, vol. BROADCAS, No. V1.2.1, Mar. 29, 2018, XP014319318, pp. 1-113.
"Draft Text of ISO/IEC 23009-1 4th Edition DAM 1 CMAF Support, Events Processing Model and Other Extensions", 129th MPEG Meeting, Jan. 13, 2020-Jan. 17, 2020, Brussels, (Motion Picture Expert Group or ISO/IEC JTC1/SC29/WG11), No. N19508, Feb. 26, 2020, XP030285347, 44 pages.
ISO/IEC 23009-1:2019(E): "Information Technology—Dynamic Adaptive Streaming Over http (DASH)—Part 1: Media Presentation Description and Segment Formats", Aug. 2019, pp. 1-226, 236 Pages.
Taiwan Search Report—TW110110932—TIPO—Aug. 5, 2024.

* cited by examiner

CMAF Chunk Structure

| Box name | Cardinality | Specification | Constraints | Description | Size |
|---|---|---|---|---|---|
| styp | 0/1 | ISO/IEC 14496-12 | DASH/CMAF constraints | Segment Type Signalling compatibility to CMAF Chunk | A few bytes |
| prft | 0/1 | ISO/IEC 14496-12 | DASH/CMAF constraints | Producer Reference Time | |
| emsg | * | ISO/IEC 23009-1 | DASH/CMAF constraints | Event Message | A few bytes |
| free | * | ISO/IEC 14496-12 | none | free box | Typically not present |
| skip | * | ISO/IEC 14496-12 | none | skip box | Typically not present |
| moof | 1 | ISO/IEC 14496-12 | DASH/CMAF constraints | Movie Fragment box and the boxes it contains | A few hundred bytes |
| mdat | 1 | ISO/IEC 14496-12 | DASH/CMAF constraints | Media Data container for media samples | Typically very large |

FIG. 7

| Element or Attribute Name | Use | Description |
|---|---|---|
| ResyncPoint | | Resync Point signalling |
| | | If present, specifies that Resync Points are present in the Segment of the corresponding Representation. |
| @type | OD default: "0" | specifies the type of the Resync Point. |
| | | If 0, specifies that on Segment format level the Resync Points present allows parsing and decryption to access the Segments, possibly in combination with the Initialization Segment of the corresponding Representation. |
| | | For all Segment formats defined in this standard, the following holds: |
| | | if greater than 0, specifies that one or multiple Resync Point are present with the properties of @type=0 and the properties defined in the element in each corresponding Segment with SAP type being equal or smaller than the one indicated in the value. |
| | | For details on SAP types, refer to clause 4.5.2. |
| @dT | O | specifies the maximum difference of the Time values of any two consecutive Resynchronization Points that are included in the @type definition above in any Media Segment for this Representation. |
| | | The value is expressed in scale of the @timescale of the corresponding Representation. |
| | | If not present, the value is unknown. |
| @dImax | O | specifies the maximum difference of the Index values of any two consecutive Resync Points that are included in the @type definition above in any Media Segment for this Representation normalized by the @bandwidth value of the Representation. |
| | | To obtain the maximum difference in octets, the value of @dImax is multiplied with the @bandwidth value. |
| | | If not present, the value is unknown. |
| @dImin | OD Default: 0 | specifies the minimum difference of the Index values of any two consecutive Resynchronization Points that are included in the @type definition of this element in any Media Segment for this Representation normalized by the @bandwidth value of the Representation. |
| | | To obtain the minimum difference in octets, the value of @dImin is multiplied with the @bandwidth value. |
| | | If not present, the value is assumed to be 0. |
| @marker | OD Default: FALSE | If set to TRUE, it specifies that every Resynchronization Point includes a specific marker for Resynchronization Point detection. |
| | | If not present or FALSE, the presence of a marker for every signalled Resynchronization Point cannot be expected. |
| @index | OD | Every Segment format making use of this functionality must specify a Resynchronization Marker. specifies the template to create the Resynchronization Point List for the defined @type. If present, a Resynchronization Point Index Segment shall be available for every corresponding available Media Segment during the nominal Segment availability times of the corresponding Media Segment. |
| | | For more details, refer to subclause 5.3.9.4.4. |

FIG. 9

DETERMINATION OF AVAILABILITY OF CHUNKS OF DATA FOR NETWORK STREAMING MEDIA DATA

This application claims the benefit of U.S. Provisional Application No. 62/994,725, filed Mar. 25, 2020, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Media data, such as audio and video data, may be packetized for transmission or storage. The media data may be assembled into a video file conforming to any of a variety of standards, such as the International Organization for Standardization (ISO) base media file format and extensions thereof, such as AVC.

SUMMARY

In general, this disclosure describes techniques for ensuring that there is available of start of segment and chunks of data, such as in dynamic adaptive streaming over HTTP (DASH), and in some examples for low-latency DASH. In some examples, a server device and/or client device may determine a validity of a service (e.g., video and/or audio representation of the media content as two examples) to determine that the service is compliant with the DASH specification. As one example, the server device and/or client device may execute a DASH-IF conformance software that tests the validity of a service offering against the promises in the specification. The determination of the validity of the service may be done by downloading minimal data.

In some cases, when accessing segments of the service (e.g., low-latency chunked segments), the server device and/or client device (e.g., via the conformance software) may access non-existing data. This disclosure describes examples that may address issues with accessing non-existing data, such as in DASH. As one example, information that indicates that start of the segment and chunks over time are available may be included in the media presentation. Moreover, the client device (e.g., DASH-clients) and/or server device (e.g., DASH-servers) may be configured to avoid accessing non-existing data (e.g., based on requirements on DASH-clients on what requests are permitted and what requests and prohibited and expected response codes for DASH-servers when requests against partially complete resources happen). In this way, the example techniques provide for a technical solution to a technical problem that provides a practical application for improvements in DASH.

In one example, a method of transporting media data includes determining that a manifest file for a media presentation includes data representing a delta time value for a resynchronization element of a segment of the media presentation: determining a multiple of the delta time value; determining a number of chunks of the segment that are currently available for retrieval using the multiple of the delta time value; and sending a request to a server device for the chunks of the segment that are currently available, wherein the request omits chunks of the segment that are not currently available.

In another example, a device for transporting media data includes a memory configured to store media data; and one or more processors implemented in circuitry and configured to: determine that a manifest file for a media presentation includes data representing a delta time value for a resynchronization element of a segment of the media presentation: determine a multiple of the delta time value; determine a number of chunks of the segment that are currently available for retrieval using the multiple of the delta time value; send a request to a server device for the chunks of the segment that are currently available, wherein the request omits chunks of the segment that are not currently available; and store data of chunks received in response to the request in the memory.

In another example, a computer-readable storage medium has stored thereon instructions that, when executed, cause a processor to determine that a manifest file for a media presentation includes data representing a delta time value for a resynchronization element of a segment of the media presentation: determine a multiple of the delta time value; determine a number of chunks of the segment that are currently available for retrieval using the multiple of the delta time value; and send a request to a server device for the chunks of the segment that are currently available, wherein the request omits chunks of the segment that are not currently available.

In another example, a device for transporting media data, comprising: means for determining that a manifest file for a media presentation includes data representing a delta time value for a resynchronization element of a segment of the media presentation: means for determining a multiple of the delta time value; means for determining a number of chunks of the segment that are currently available for retrieval using the multiple of the delta time value; and means for sending a request to a server device for the chunks of the segment that are currently available, wherein the request omits chunks of the segment that are not currently available.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a table illustrating an example of a common media application format (CMAF) chunk structure.

FIG. 9 is a table illustrating a Resync Point element and attribute names and corresponding descriptions.

DETAILED DESCRIPTION

Figure 1:
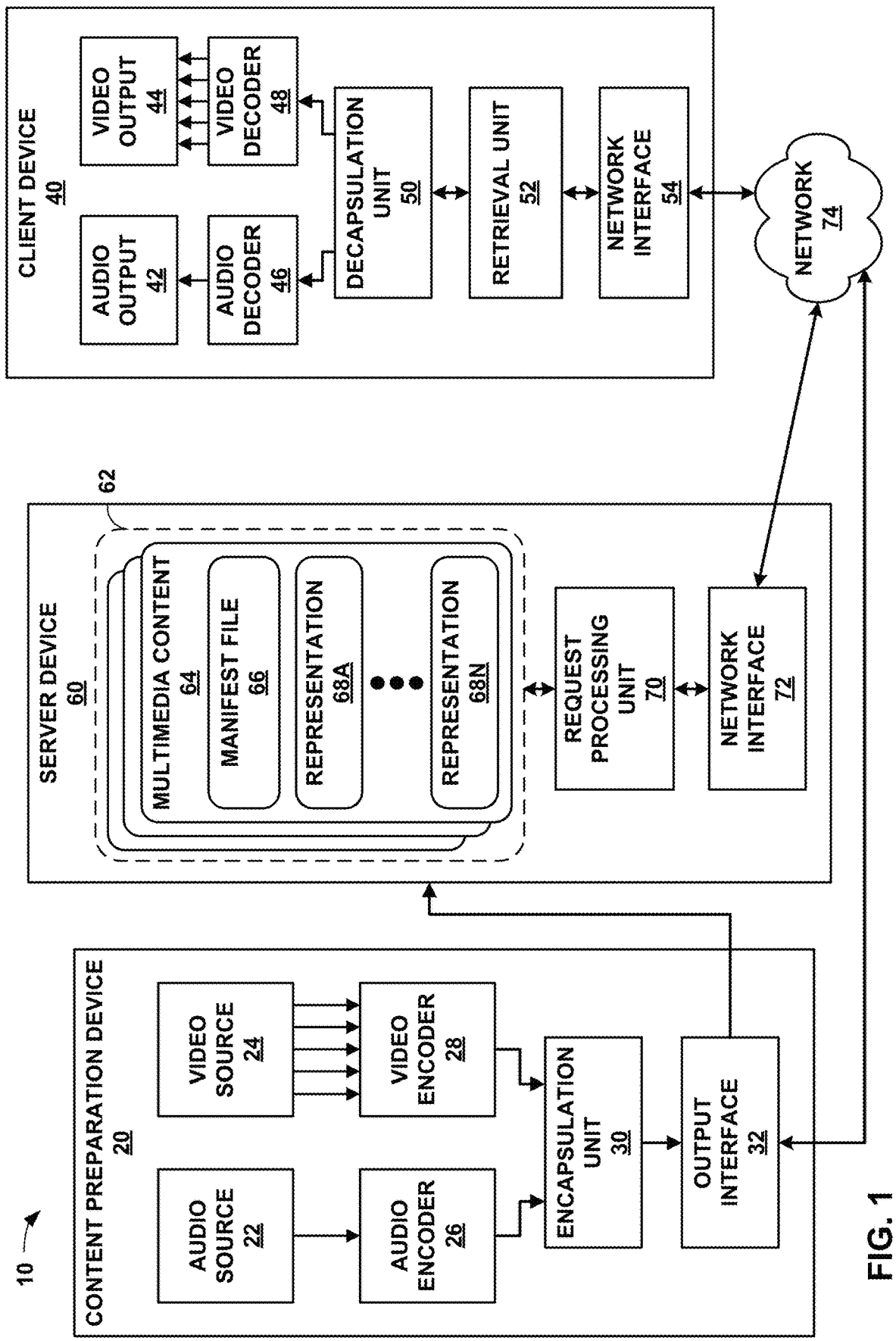
FIG. 1 is a block diagram illustrating an example system that implements techniques for streaming media data over a network according to the techniques of this disclosure.

In general, this disclosure describes techniques for determining chunks of a segment that are available for retrieval, such as in dynamic adaptive streaming over HTTP (DASH), and in some examples for low-latency DASH. In particular, these techniques may allow for determination of when the chunks are available before the segment itself is fully available. These techniques may allow a client device to request chunks of a segment at times when the chunks are determined to be available, rather than waiting for the segment to be fully formed before requesting data of the segment. In this manner, these techniques may be used to reduce latency in the context of streaming of live-captured media data. That is, rather than waiting for the full amount of time for the segment to be fully formed (e.g., captured, encoded, and encapsulated), the client device may request chunks (sub-portions) of the segment as soon as the chunks are available.

In particular, a server device may send a manifest file (e.g., a media presentation description (MPD) in DASH) to the client device. The manifest file may advertise whether or not the manifest file includes a delta time value (e.g., an @dT attribute) for a resynchronization element of the segment. When the manifest file includes the delta time value, the client device may use the delta time value to determine when particular chunks of the segment are available. In particular, the manifest file may signal nominal segment availability start time (NSASTs) for segments. When the manifest file signals a delta time value for a resynchronization element of a segment, the client device may determine a number of chunks of the segment that are currently available at a current time using the delta time value.

In particular, the client device may determine that a first chunk is available at the signaled NSAST for the segment. The client device may then determine availability of subsequent chunks of the segment based on an amount of time that has elapsed since NSAST. For each multiple of the delta time value that has elapsed since NSAST, the client device may determine that number of chunks is currently available. In other words, at time NSAST+N*@dT, where N is an integer multiple, the client device may determine that the first chunk and N additional chunks of the segment are available for retrieval. When a segment does not have a resynchronization element, the client device may simply request the segment using a request for the segment in its totality instead of requesting individual chunks of the segment.

Moreover, the client device may determine a value from the manifest file representing a minimum size of data between two random access points (e.g., two resynchronization elements), such as an @dImin value. The client device may use this value to determine an amount of data of a segment that is available for retrieval at a current time using the multiple discussed above. In particular, if again the current time is NSAST+N*@dT, the client device may determine that (N+1)*@dImin data of the segment is available. Thus, the client device may construct an HTTP partial GET request specifying a "range:" header that defines a range including N*@dImin data. Alternatively, if B represents a latest byte of the segment that has been previously requested, the client device may construct a request specifying a range including (N+1)*@dImin—B data.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP (hypertext transfer protocol) streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0 if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40) and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and High Efficiency Video Coding (HEVC) standard, and the upcoming Versatile Video Coding (VVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The VVC standard defines "profile" as a specified subset of syntax of VVC and defines "level" as set of constraints on the values that may be taken by the syntax elements and variables of VVC. In some examples, in VVC, the same set of levels is defined for all profiles, with most aspects of the definition of each level being in common across different profiles. Individual implementations may, within the specified constraints, support a different level for each supported profile.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

The above is described with respect to H.264/AVC. The decoder may similarly determine whether the decoder is capable of properly decoding VVC or HEVC conforming bitstreams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

In accordance with the techniques of this disclosure, manifest file 66 may signal nominal segment availability start times (NSASTs) of segments of representations 68. Manifest file 66 may also signal delta time values for resynchronization elements of segments of representations 68. Client device 40 may retrieve manifest file 66 and use the NSASTs and delta time values to determine availability of chunks of the segments. In particular, retrieval unit 52 of client device 40 may determine, for example, that an Nth chunk of a segment is available at time NSAST+(N−1) *@dT, where @dT is the signaled delta time value. Thus, retrieval unit 52 may request chunks of the segments at the corresponding times, in order to retrieve the chunks as close to the times at which the chunks are available, thereby reducing latency associated with streaming media data of the segments.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop play back or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40) may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., a floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In this manner, client device 40 represents an example of a device for transporting media data including a memory configured to store media data; and one or more processors implemented in circuitry and configured to: determine that a manifest file for a media presentation includes data representing a delta time value for a resynchronization element of a segment of the media presentation: determine a multiple of the delta time value; determine a number of chunks of the segment that are currently available for retrieval using the multiple of the delta time value; send a request to a server device for the chunks of the segment that are currently available, wherein the request omits chunks of the segment that are not currently available; and store data of chunks received in response to the request in the memory.

Figure 2:
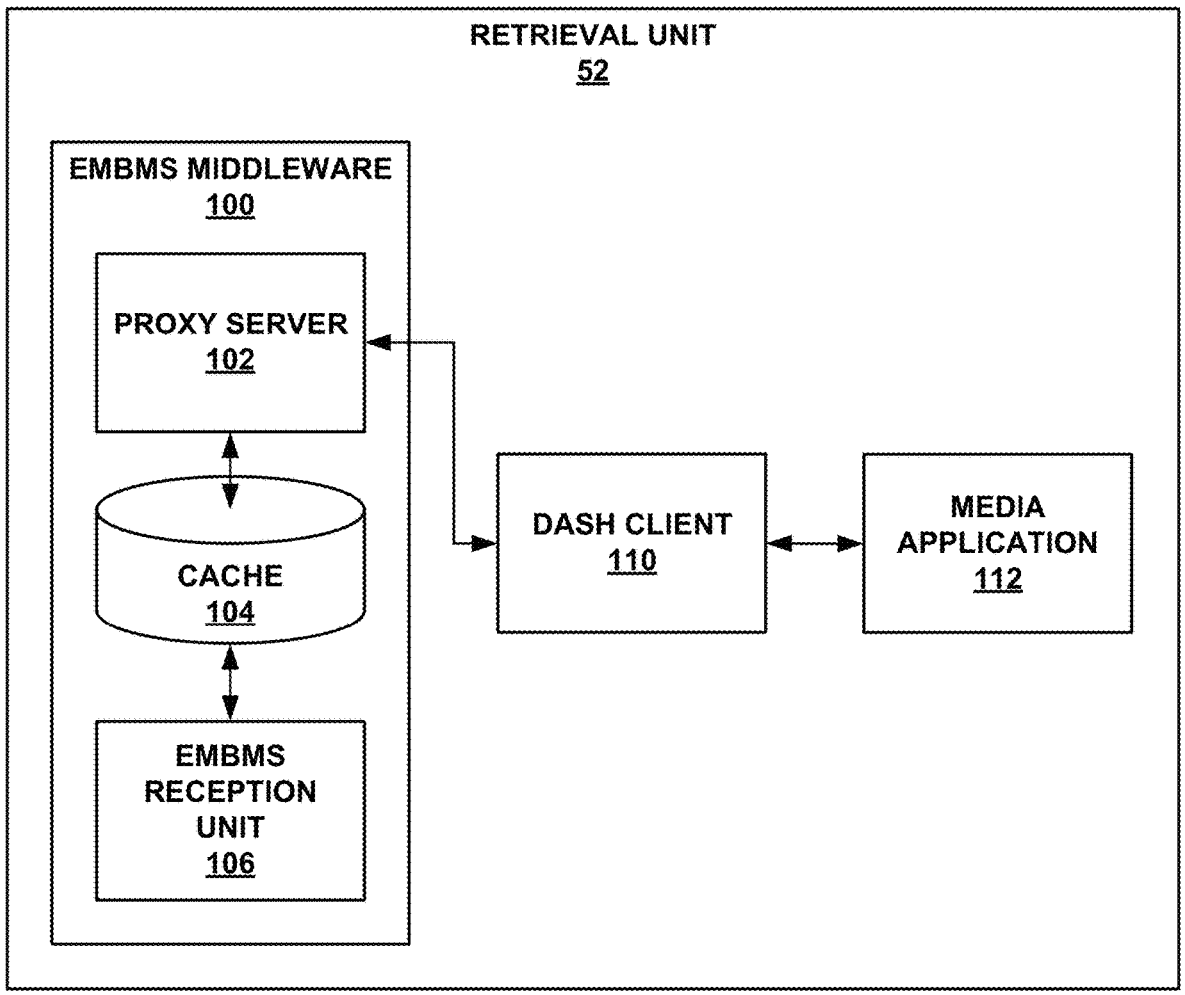
FIG. 2 is a block diagram illustrating an example set of components of retrieval unit of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE-File Delivery over Unidirectional Transport," Network Working Group, RFC 6726, November 2012, available at tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPV4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Figure 3:
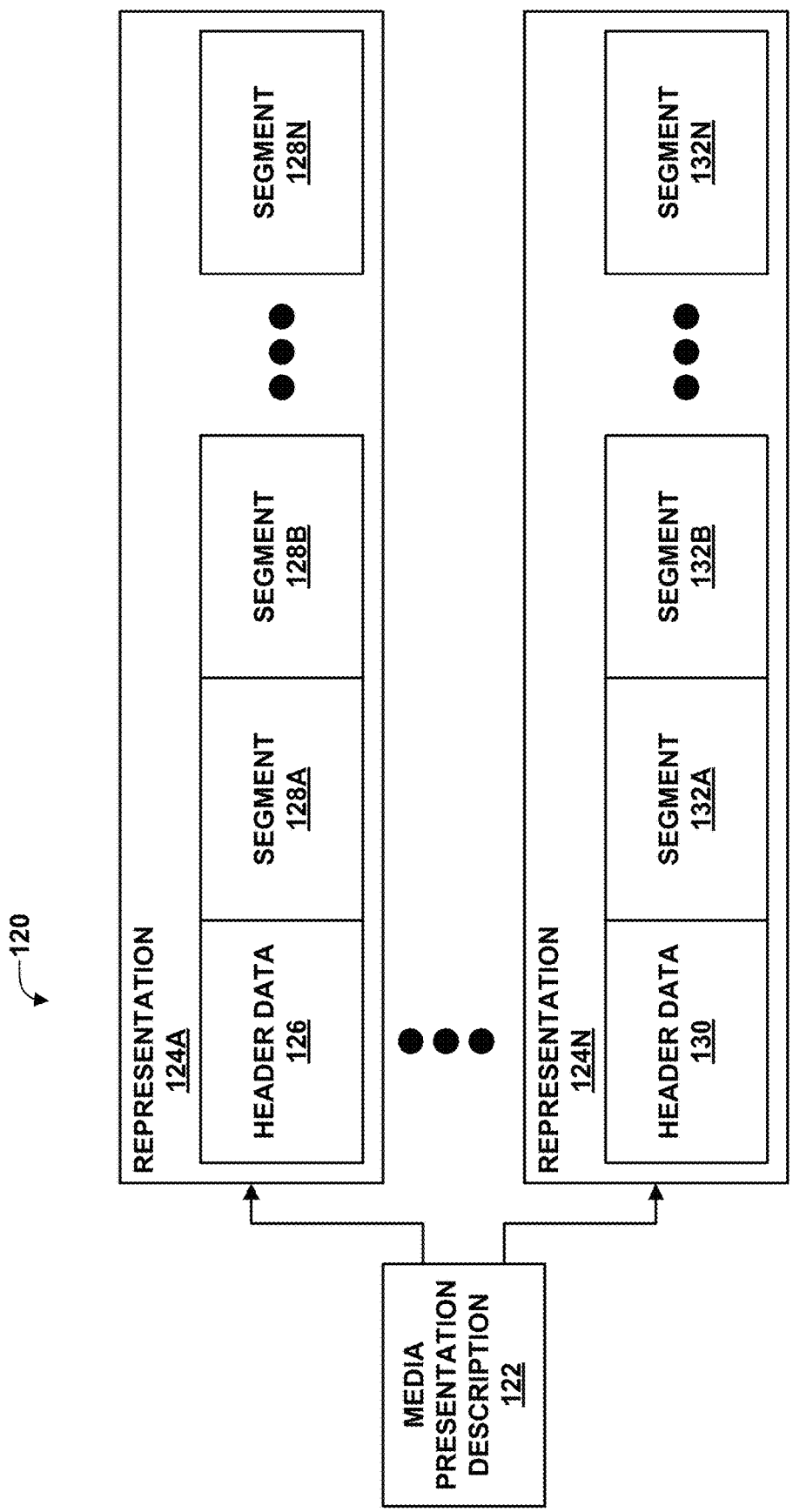
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Although not shown in FIG. 3, some of segments 128, 182 may include respective chunks of data including media data that can be requested using, e.g., byte range requests. In particular, the byte range requests may be HTTP partial GET requests specifying a "range:" header. According to the techniques of this disclosure, retrieval unit 52 (FIG. 1) may submit such a request specifying a byte range according to an amount of data that MPD 122 indicates is available at a particular time. That is, MPD 122 may signal nominal segment availability start times (NSASTs) for segments 128, 132, as well as delta time values (e.g., @dT attributes) for resynchronization elements of one or more of segments 128, 132 and data representing a minimum size of data between two random access points (e.g., @dImin values). Retrieval unit 52 may determine that N+1 chunks of a segment are available at time NSAST+N*@dT, and that (N+1)*@dImin bytes of data are available to be requested at time NSAST+

Figure 4:
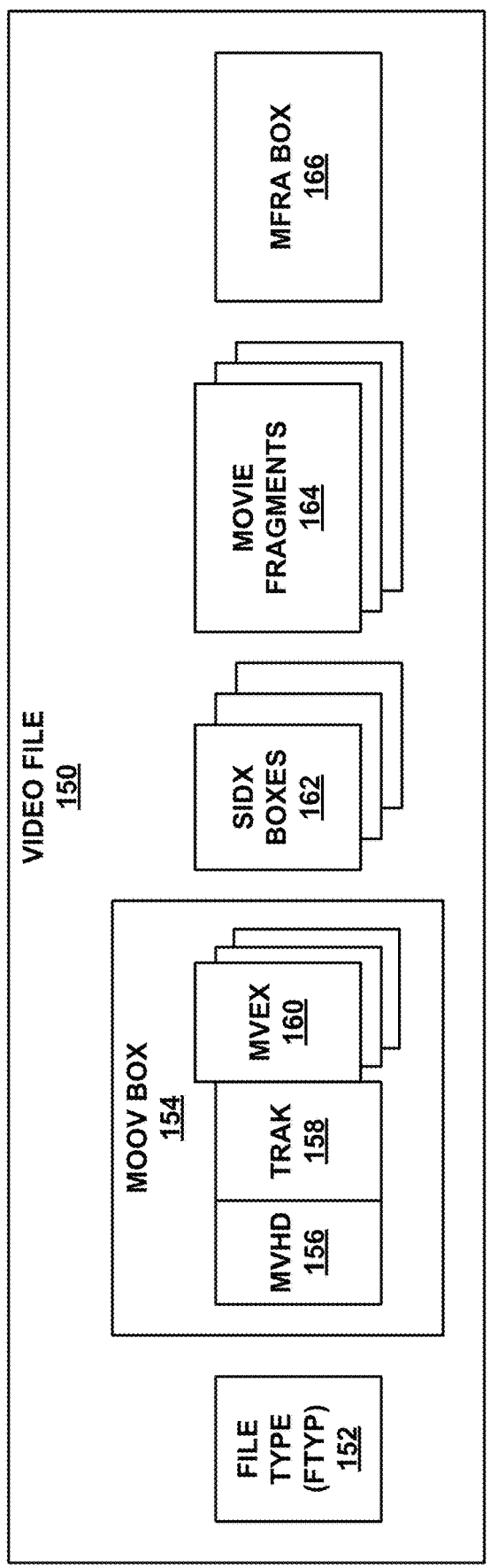
FIG. 4 is a block diagram illustrating elements of an example video file, which may correspond to a segment of a representation, such as one of the segments of FIG. 3.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of play back for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of play back time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., play back times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

In some examples, a DASH packager (e.g., retrieval unit 52, such as DASH client 110 of retrieval unit 52) receives information on the general description of the service as well as the encoder configuration (e.g., level and profile information, as one example). As described, audio encoder 26 and/or video encoder 28 may produce common media application format (CMAF) chunks and fragments, that may form part of respective multimedia content 64.

The chunks are mapped by the MPD packager (e.g., encapsulation unit 30 or possibly a component of server device 60) onto segments and provided to the network 72 in incremental fashion. In some examples, segments are not delivered as a whole, but progressively as segments are generated.

There may a signaling in the MPD (@availability TimeOffset and @availability Complete). When a low latency DASH client (e.g., DASH client 110) does the calculation, the low latency DASH client should do the same calculation but request the next segment when its first chunk becomes available on the origin, signaled by the @availability TimeOffset parameter from the DASH manifest (e.g., manifest 66).

Every media segment can be added to the play back buffer in one or several steps, as the CDN (content delivery network (e.g., server device 60)) is delivering the Live Edge Segment in HTTP chunked transfer encoding mode. The @availability Complete tells the client (e.g., client device 40 or DASH client 110) that the media segment is not yet available on the server (e.g., server device 60)) at the computed nominal segment availability time.

Additional details can be found in the DASH-IF draft CR, available from https://dashif.org/docs/DASH-IF-IOP-CR-Low-Latency-Live-Community-Review.pdf, as well as in DVB-DASH in ETSI TS 103 285, available from https://www.etsi.org/deliver/etsi_ts/103200_103299/103285/01.02.01_60/ts_103285v010201p.pdf. Further information is also available at: DVB-DASH BlueBook A168, "MPEG-DASH Profile for Transport of ISO BMFF Based DVB Services over IP Based Networks", February 2019, https://www.dvb.org/resources/public/standards/a168_dvb_mpeg-dash_feb_2019.pdf.

Figure 5:
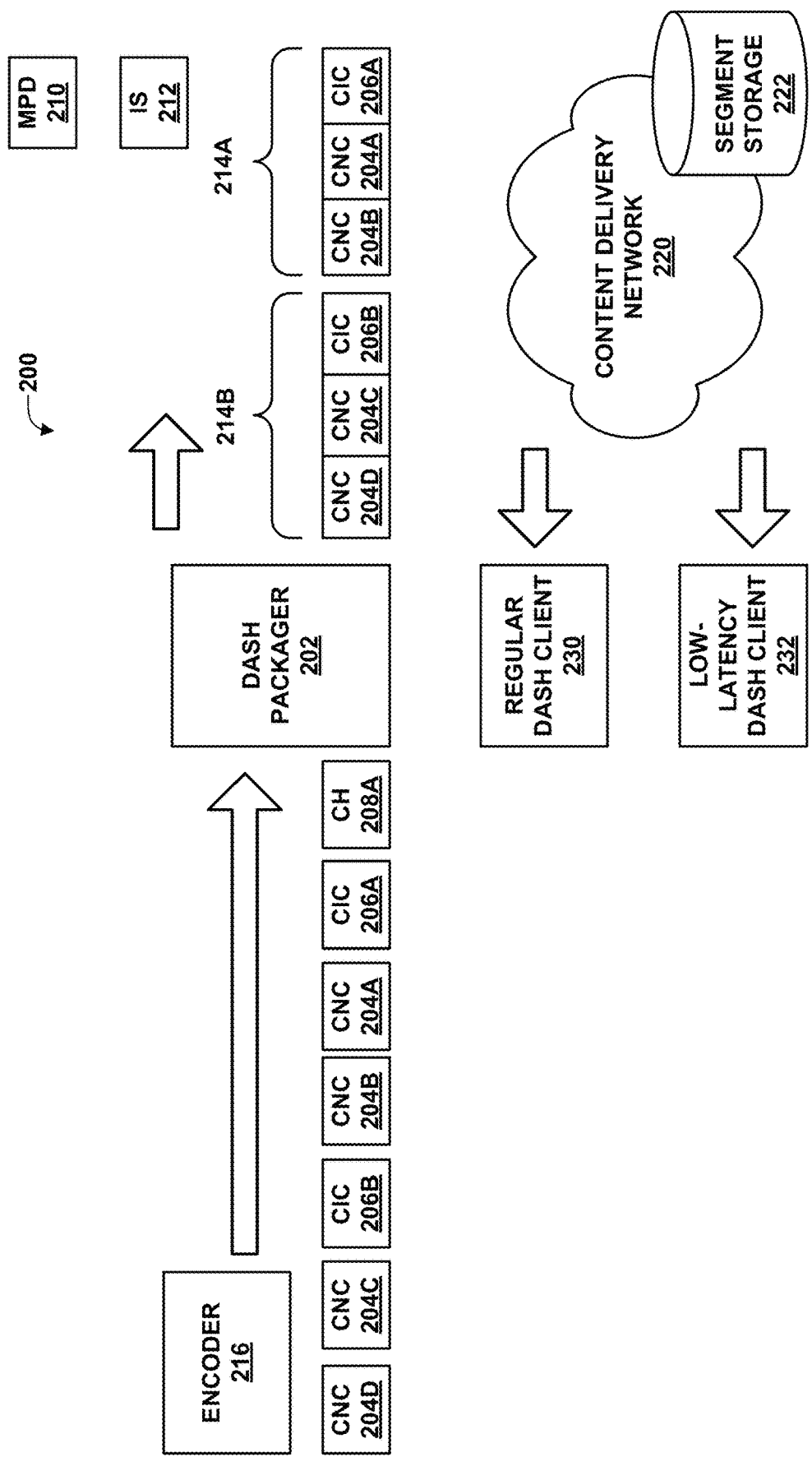
FIG. 5 is a conceptual diagram illustrating an example low-latency architecture that may perform the techniques of this disclosure.

FIG. 5 is a conceptual diagram illustrating an example low latency architecture 200 that may perform the techniques of this disclosure. In this example, FIG. 5 illustrates a basic flow of information for operating a low-latency DASH service according to DASH-IF IOPs. Low latency architecture 200 includes DASH packager 202, encoder 216, content delivery network (CDN) 220, regular DASH client 230, and low-latency DASH client 232. Encoder 216 may generally correspond to either or both of audio encoder 26 and video encoder 28 of FIG. 1, while DASH packager 202 may correspond to encapsulation unit 30 of FIG. 1.

In this example, encoder 216 encodes received media data to form CMAF headers (CH) such as CH 208, CMAF initial chunks 206A, 206B (CIC 206), and CMAF non-initial chunks 204A-204D (CNC 204). Encoder 216 provides CH 208, CIC 206, and CNC 204 to DASH packager 202. DASH packager 202 also receives a service description, which includes information on the general description of the service and an encoder configuration of encoder 216.

DASH packager 202 uses the service description, CH 208, CIC 206, and CNC 204 to form media presentation description (MPD) 210 and initialization segment 212. DASH packager 202 also produces maps CH 208, CIC 206, and CNC 204 into segments 214A, 214B (segments 214) and provides segments 214 to CDN 220 in an incremental fashion. DASH packager 202 may deliver segments 214 in the form of chunks as they are generated. CDN 220 includes segment storage 222 for storing MPD 210, IS 212, and segments 214. CDN 220 delivers full segments to regular DASH client 230, but individual chunks (e.g., CH 208, CIC 206, and CNC 204) to low-latency DASH client 232, e.g., in response to HTTP Get or partial Get requests from regular DASH client 230 and low-latency DASH client 232.

Figure 6:
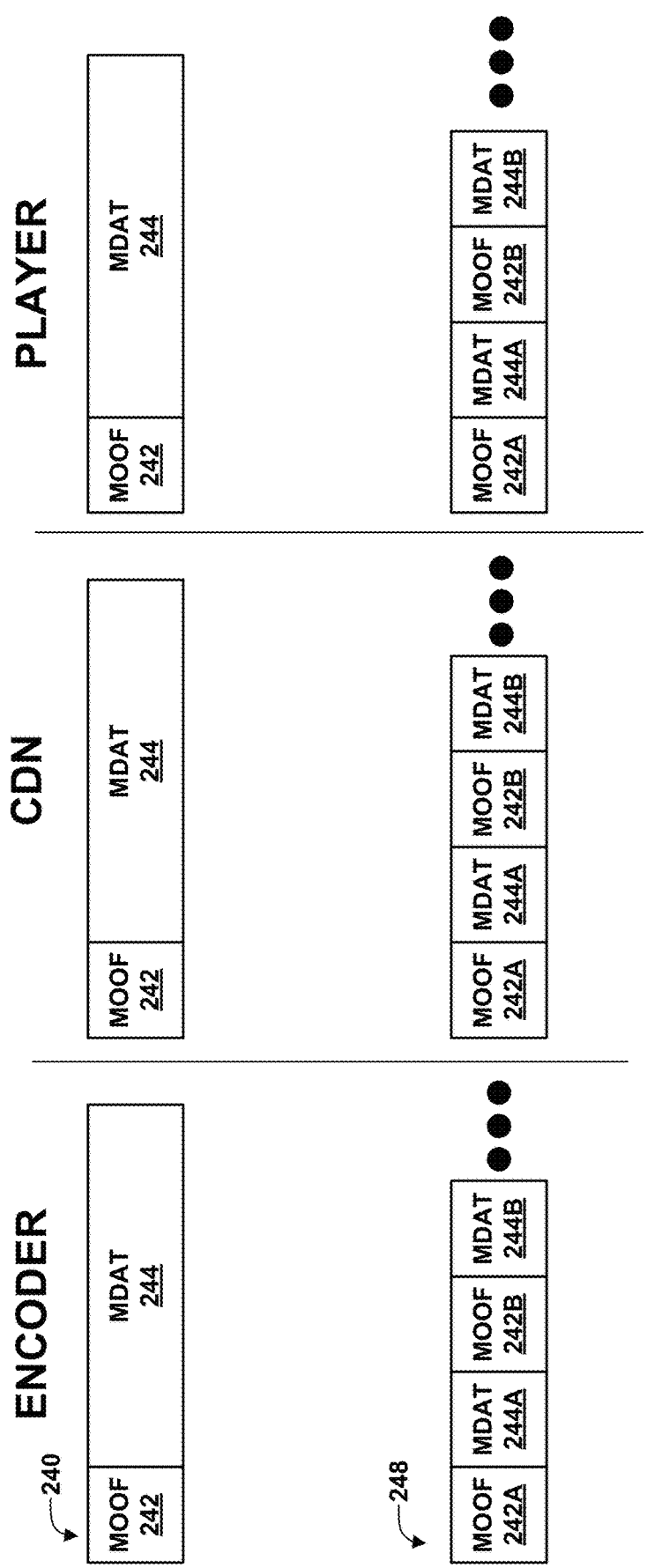
FIG. 6 is a conceptual diagram illustrating an example of chunked segment distribution.

FIG. 6 is a conceptual diagram illustrating an example of chunked segment distribution. In some examples, the encoder of FIG. 6 represents audio encoder 26 and/or video encoder 28 of FIG. 1; the content delivery network (CDN) of FIG. 6 includes server device 60 of FIG. 1; and the player of FIG. 6 represents at least a portion of client device 40 of FIG. 1.

FIG. 6 depicts both full segments and chunked segments. In this example, segment 240) includes movie fragment (MOOF) box 242 and movie data (MDAT) box 244. Also in this example, chunked segment 248 includes multiple MOOF fragments 242A-242B (MOOF boxes 242) and MDAT boxes 244A-244B (MDAT boxes 244). Thus, content preparation device 20 (FIG. 1) may prepare chunked segment 248 to include multiple MOOF boxes 242 and MDAT boxes 244. Thus, the player of FIG. 6 may retrieve individual pairs of MOOF boxes 242 and MDAT boxes 244 as chunks of chunked segment 248. That is, for example, MOOF box 242A and MDAT box 244A may represent one chunk, MOOF box 242B and MDAT box 244B may represent another chunk, and so on.

FIG. 7 is a table illustrating an example of a common media application format (CMAF) chunk structure. In the example of FIG. 7, every box may have a type as well as size in the beginning. No data may be outside the boxes. Having type and size at beginning with no data outside the boxes may allow finding the start of a new box.

There may be certain problems in conventional techniques concerning low-latency DASH. As described above, in some examples, a DASH-IF conformance test (e.g., software test performed by client device 40 by retrieval unit 52, as one example) may test the validity of a service offered against the promises of the specification (e.g., test if service is compliant with a specification so as to determine level and profile information). In some examples, the test is implemented such that only a minimal data needs to be downloaded. During such testing, media is typically skipped, and only file format structures are downloaded. This means that the MDAT box is typically not downloaded as whole, only its type and size are downloaded.

By doing so, the conformance software may request an initial byte range of the segment at the adjusted availability start time, download the data and analyze the data in all boxes except MDAT, take the MDAT size and identify the start of the next box, download a byte range to request the next chunk start (STYP, MOOF, start of MDAT), and continue doing so. In some situations, in doing the test, the downloaded data is inconsistent resulting in unexpected issues.

The inconsistency in the download data may not be due to conformance software. For instance, it may be possible that when accessing low-latency chunked segments, access is made to non-existing data. As one example, a moof is not yet produced, and there is no warning or any 404 error, unclear response, or possibly retrieval of garbage data. That is, retrieval unit 52 may operate as designed but may access non-existing data. In this case, rather than receiving an error message or some other notification of accessing non-existing data, retrieval unit 52 may retrieve garage data.

The DASH low-latency specification may not have information on when is the latest time that the next chunk is available on the server and what happens if the request is issued to a non-available byte range (e.g., which may cause unexpected responses that client devices are not configured to address). It is also unclear in the DASH low-latency specification what the client is permitted to do in terms of requesting the parts of the segment and what HTTP requests are permitted and what the response would be. For HTTP/1.1, it is unclear what requests to non-complete files are permitted and what is for example the size that is reported. There may be other such issues, and the most relevant information should be checked.

There may be various reasons for the above issues. For instance, segments can be accessed at the adjusted segment availability start time (ASAST) which the nominal availability start time NSAST—availability TimeOffset and an ordinal first chunk of a segment is fully accessible at NSAST. When accessing Segments with an HTTP request in between ASAST and NSAST, segments are served entirely until the end of the Segment in a single request. In conventional DASH, some client devices are constructed under the assumption that when attempting to access a segment with an HTTP request at a time between ASAST and NSAST, the segment is gradually produced and sent until the end of the segment in response to a single request for the segment. However, this need not be case. For instance, nothing is actually promised in the DASH specification on this matter. That is, there may not be a restriction that segments are gradually produced and sent until the end of the segment in a single request such as when accessing segments with an HTTP request in between ASAST and NSAST.

This disclosure describes example techniques to address the issues. For instance, this disclosure describes examples for adding to the Media Presentation (e.g., manifest file) offering some enriched information that indicates the availability of the start of segment and chunks over time (e.g., promises not only the availability of the start of the segment, but also of chunks over time). The disclosure also describes adding more requirements for DASH-clients (e.g., DASH client 110) on what requests are permitted and what requests are prohibited. The disclosure also describes adding expected response codes for DASH servers (e.g., server device 60) when requests against partially complete resources happen.

In Amd. 1 of 4th edition, MPEG introduced the Resync element. An overview of the Resync element signaling and semantics is provided further below.

In the following, some extensions to Resync are proposed to address the issue. As one example, it may be possible to add a signaling that the chunks are available after a certain time, namely using the @dT attribute. The signaling can be implicit (if @availability Complete=FALSE) is signaled, or some explicit new signal.

The promise (e.g., ensuring that chunks are available) is as follows. In other words, encapsulation unit 30 and/or request processing unit 70 may ensure that at NSAST, the first chunk is available and at least @dImin data can be accessed, at NSAST+dT, the second chunk is available and at least 2*@dImin data can be accessed, at NSAST+2*dT, the third chunk is available and at least 3*@dImin data can be accessed, and at NSAST+i*dT, the (i+1)-th chunk is available and at least (i+1)-th*@dImin data can be accessed.

In some examples, the following extensions to Resync client behavior may address the issue. If no Resync is present and the @availability Complete=FALSE is signaled, clients (e.g., DASH client 110) are expected to not access the segment with byte range requests. Clients (e.g., DASH client 110) should not expect that any media data is available prior to NSAST at the receiver.

If a Resync element is present with a @dT and @dImin, client devices (e.g., DASH client 110) may be permitted to access byte range requests that are available at the current time NOW. Clients (e.g., DASH client 110) may be permitted to access chunks that are available at the current time NOW. Clients (e.g., DASH client 110) may not be expected to access the segment with byte range requests that are not yet available.

Figure 8:
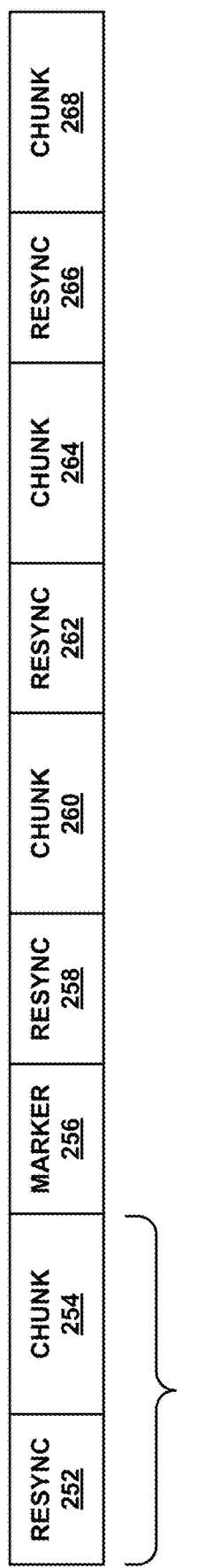
FIG. 8 is a conceptual diagram illustrating examples of markers and resynchronization points of a segment.

FIG. 8 is a conceptual diagram illustrating examples of markers and resynchronization points of a segment. A resynchronization point, such as resync points 252, 258, 262, 266, in a segment may be defined as follows:
   a. A Resynchronization (Resync) Point enables the start of parsing and processing at container level (e.g., file format box level).
   b. A Resync Point has assigned the following properties:
      i. It has a byte offset or index Index (e.g., index 270) from the start of the Segment, pointing to the Resynchronization Point.
      ii. It has assigned an earliest presentation time Time in the Representation, i.e. the smallest presentation time of any sample included in the Representation when starting processing from the Resynchronization Pointer.
      iii. It has assigned a type Type, for example defined by the SAP type in ISO/IEC 14496-12.
      iv. It has assigned a boolean marker property Marker whether the Resynchronization Point can be detected while parsing Segment through a specific structure or if the resync point needs to be signaled by external means.
   c. Start processing the Segment from a Resynchronization Point, together with the information in the Initialization Segment, if present, allows container parsing. The ability whether and how to access the contained and potentially encrypted elementary stream is indicated by the resynchronization access point type.

FIG. 9 is a table illustrating a Resync Point element and attribute names and corresponding descriptions. In some examples, resync points are signaled by providing a binary map for each Resynchronization Point in a Resynchronization Index Segment for each Media Segment. This is most easily used for Segments that are fully available on the network. In some example, resync points are signaled by signaling the existence of Resynchronization Points in a Media Segment with additional information that permits to easily locate the Resync in terms of the byte position and the presentation time, as well as providing the type of the Resynchronization Point.

Figure 10:
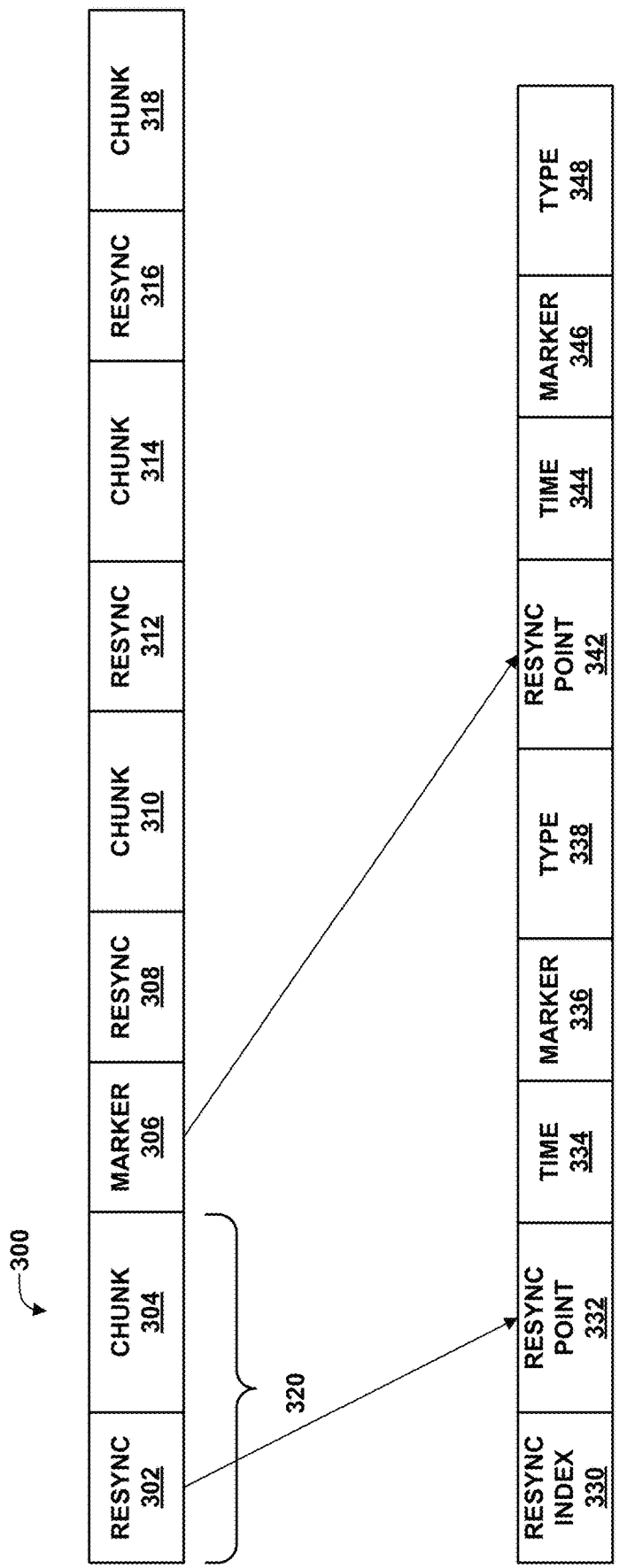
FIG. 10 is a conceptual diagram illustrating an example of a resync index.

FIG. 10 is a conceptual diagram illustrating an example of a resync index. In this example, segment 300 includes resyncs 302, 306, 312, and 316, chunks 304, 310, 314, and 318, and marker 306. In this example, index 320 represents resync 302 and chunk 304. Resync 302 also represents a set of data including resync index 330, resync point 332, time 334, marker 336, and type 338, while marker 306 represents resync point 342, time 344, marker 346, and type 348.

Figure 11:
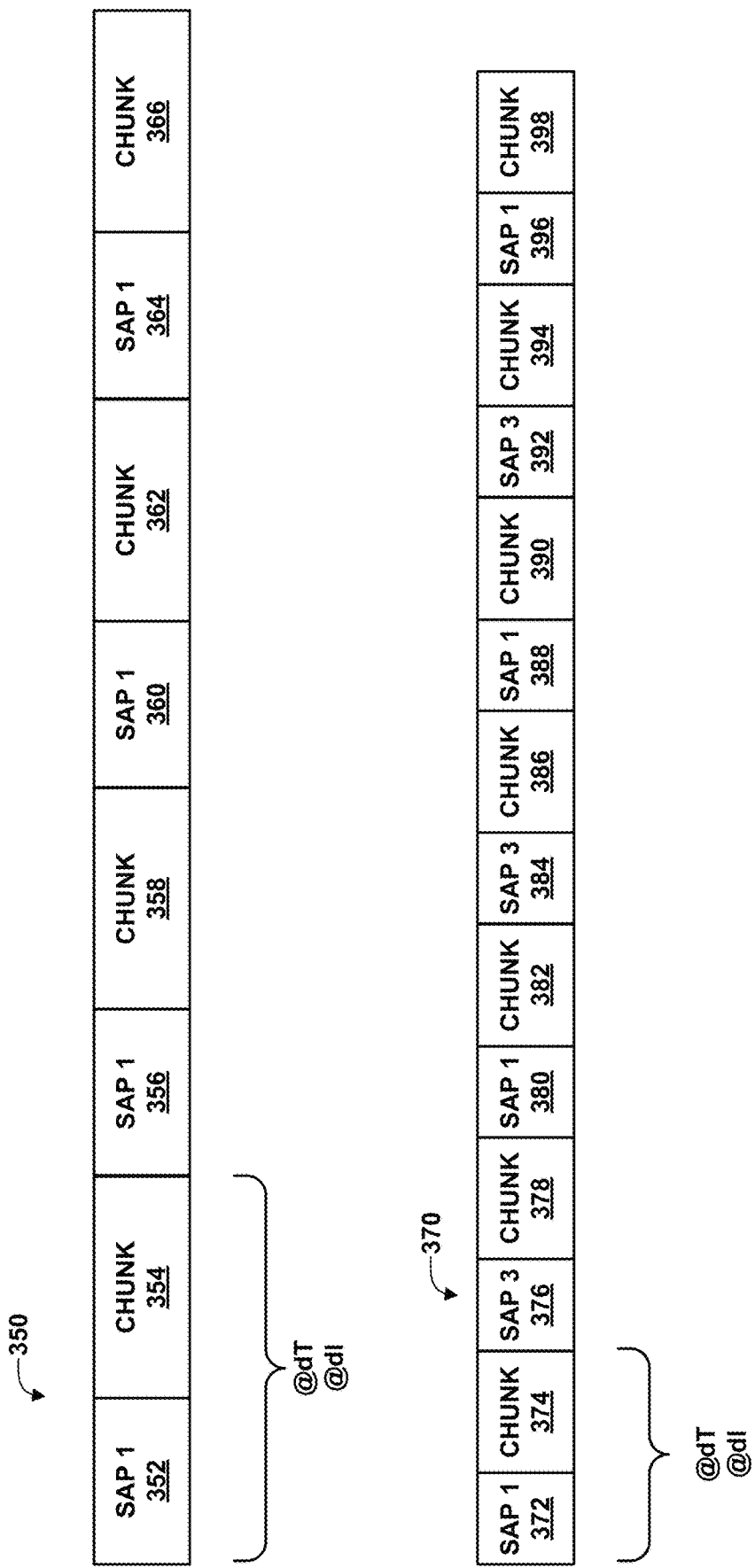
FIG. 11 is a conceptual diagram illustrating an example of an @dT element and an @dI attribute of a Resync Point.

FIG. 11 is a conceptual diagram illustrating an example of an @dT attribute and an @dI attribute of a Resync Point. In this example, segment 350 includes stream access point (SAP) 1's 352, 356, 360, and 364 and chunks 354, 358, 362, and 366. Segment 370 includes SAP 1's 372, 280, 388, and 396, SAP 3's 376, 384, and 392, and chunks 374, 378, 382, 386, 290, 394, and 398. As shown in FIG. 11, SAPs are more frequent in segment 370 than in segment 350. Thus, @dT and @dI are shorter for segment 370 than for segment 350. In particular, each @dT and @dI represents a pair of SAP and a chunk of media data. Because @dT and @dI attributes of segment 370 are smaller, segment 370 can support reduced latency relative to segment 350.

The following describes examples of signaling use cases. For signaling fast joining, downswitching, or resynchronization, at least one Representation is present with @bandwidth value is the lowest in the Adaptation Set and the and it contains a Resync element with the following settings; the @type value is set to 1 or 2 and the @dT is set such that the value normalized by the @timescale of the Representation is at most the signaled target latency and should be smaller than half of the signaled target latency.

The @marker may be set to TRUE. On Representation level @dT provides the maximum and nominal distance of two random access points, @dImax provides the maximum size of the data in between the two random access points, and if unknown, parameter may be omitted, @dImin provides the minimum size of the data in between the two random access points, and if unknown, parameter may be omitted, and @type is set to 1, 2 or 3 to indicate that random access is possible.

The following describes client implementation (e.g., DASH client 110). For resynchronization cases, there may be low latency streaming and fast access to the service, fast channel acquisition in broadcast services, low latency streaming and resynchronization after losses or buffer underruns, fast down-switching in low duration buffer cases, fast and efficient seeking to time.

For resynchronization and restart, there may be finding the box structure within the Segment, finding a proper Resynchronization Point including with all relevant information that are needed to start parsing and decoding, finding the earliest presentation time that is presented, processing of Event messages, if applicable, obtaining all decryption relevant information, if applicable, and start decoding on elementary stream level The following describes the box structure for resynchronization. There may be different ways to resynchronize on box structure at a specific time. If the Segment Index is provided, then resynchronization can be done at presentation times and byte offsets. However, a Segment Index is typically not available for dynamic services.

If the Resynchronization Point Index is provided, then resynchronization can be done at presentation times and byte offsets. This may apply for regular live services, but not be suitable in case of low-latency.

If the start of the Segment is accessible, the Segment can be downloaded from the beginning and be parsed until the proper Index and Time is found. However, such downloading may require unnecessary bandwidth or may not be fast enough.

Resynchronization information is provided by the underlying protocol, that for example provides the Index to each Resynchronization Point and this information is passed to the DASH client.

If the start of the Segment is not available, then finding a Resynchronization Point based on a proper pattern is possibly. Once found, regular parsing can start and find the proper box structure that allows you processing, in particular 'emsg', 'prft', 'mdat', 'moof' and 'mdat'.

The following describes searching for markers. Before parsing the Segment, it is recommended to download only a part of the Segment that will include the Resynchronization Point. For this purpose, the information in the Resync@dT, Resync@dMax and Resync@dMin can be used. If the Resync@marker is set, then the client can parse the byte stream as follows to find the Index of the next Resynchronization Point.

Find an occurrence of the 'styp' byte string in a segment, say at byte offset B1. Verify against a random emulation as follows: the next box type is compared against the list of any of the expected box types: 'styp', 'prft', 'emsg', 'moof', 'mdat', 'free', 'skip. If one of the known box types is found, byte offset B1-4 octets is the Index of the Resynchronization Point. If this is not one of the known box types noted before, this occurrence of 'styp' box is considered an invalid Resynchronization Point and ignored. Restart from above.

The following describes using resync information. The earliest presentation time may be the Time of the Resynchronization Point. This earliest presentation time may indicated by the use of the 'tfdt' and other information in the movie fragment header.

For the type of the Resynchronization Point, there may be several options. One option may be a detection based on the information in the 'moof'. One option may be the use of compatibility brands for SAP types.

If CMAF is in use as defined in ISO/IEC 23000-1, the following can be deduced: 'cmff': indicates that the SAP is 1 or 2, 'cmfl': indicates that the SAP is 0), and 'cmfr': indicates that the SAP is 1, 2 or 3. Once proper Time and Index is found, an early Resynchronization the media pipeline can be initiated.

Figure 12:
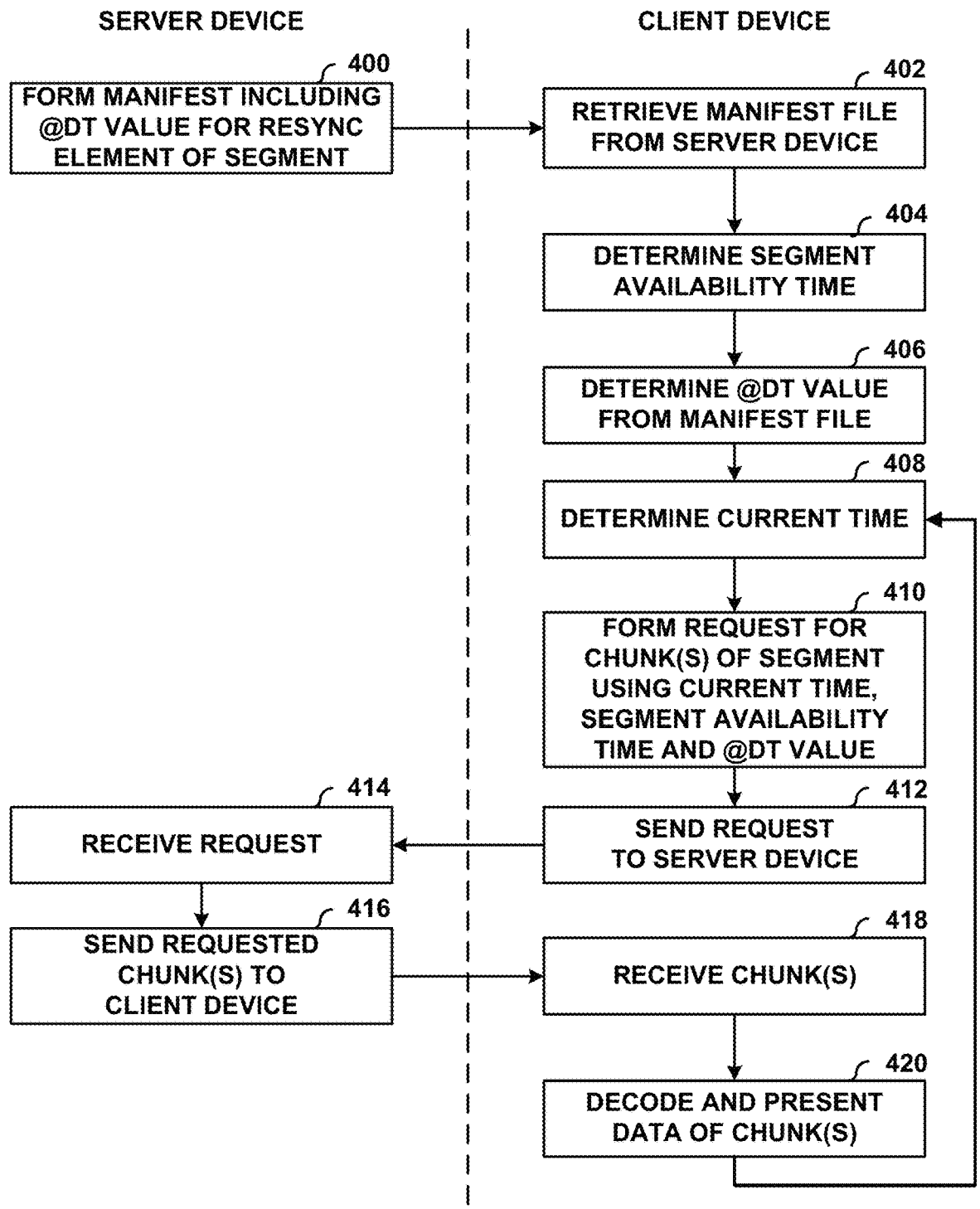
FIG. 12 is a flowchart illustrating an example method for performing techniques of this disclosure.

FIG. 12 is a flowchart illustrating an example method for performing techniques of this disclosure. The method of FIG. 12 may be performed by client device 40 and server device 60 of FIG. 1. Actions attributed to the server device may additionally or alternatively be performed by content preparation device 20 of FIG. 1. In other examples, other devices may be configured to perform these or other functions in accordance with the techniques of this disclosure. For example, low-latency DASH client 232, encoder 216, DASH packager 202, and CDN 220 of FIG. 5 may be configured to perform the techniques of this disclosure.

Initially, server device 60 may form a manifest file including an @dT value for a resynchronization (resync) element of a segment (400). Alternatively, server device 60 may receive the manifest file from content preparation device 20 in some examples. The manifest file may be a media presentation description (MPD) as discussed above.

Client device 40 may then request the manifest file from server device 60 (402). Client device 40 may parse and process the manifest file to determine a segment availability time, such as a nominal segment availability start time (NSAST) (404). According to the techniques of this disclosure, the NSAST value may represent a time at which an ordinal first chunk of the segment is available.

Accordingly, client device 40 may then determine a current time (408). Assuming the current time is at or after the NSAST for the chunk of the segment, client device 40 may form a request for one or more chunks of the segment, which may include the ordinal first chunk, using the current time, the segment availability time, and the @dT value (410). In particular, if the current time is after the NSAST but less than one @dT value from NSAST, client device 40 may request just the ordinal first chunk. If the current time is between one @dT value from the NSAST and two @dT values from the NSAST, client device 40 may determine that both the ordinal first chunk and an ordinal second chunk of the segment are available, and thus, client device 40 may form a request specifying both the first and second chunks, or just the second chunk if the first chunk has already been requested.

In particular, client device 40 may form the request as an HTTP partial GET request specifying a byte range of the segment corresponding to the chunk(s) to be requested. Client device 40 may, for example, determine an amount of data available at a particular time using a multiple of an @dImin value signaled in the manifest file. In particular, at $N*@dT$ after the NSAST, client device 40 may determine that $(N+1)*@dImin$ bytes of data are available for retrieval. Thus, client device 40 may specify the byte range according to this determination. Ultimately, client device 40 may send the request to server device 60 (412).

Server device 60 may then receive the request from client device 40 (414). Server device 60 may send the requested chunk(s) to client device 40 (416). Client device 40 may then receive the chunk(s) (418) and decode and present media data of the chunk(s) (420). Client device 40 may then again determine a new current time (408) and request one or more newly available chunks.

In this manner, the method of FIG. 1 represents an example of a method including determining that a manifest file for a media presentation includes data representing a delta time value for a resynchronization element of a segment of the media presentation: determining a multiple of the delta time value; determining a number of chunks of the segment that are currently available for retrieval using the multiple of the delta time value; and sending a request to a server device for the chunks of the segment that are currently available, wherein the request omits chunks of the segment that are not currently available.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of transporting media data, the method comprising:
   determining that a manifest file for a media presentation includes data representing a delta time value and a value representing a minimum size of data between two random access points for a resynchronization element of a first segment of the media presentation;
   in response to determining that the manifest file for the media presentation includes the data representing the delta time value and the value representing the minimum size of data between two random access points for the resynchronization element of the first segment of the media presentation:
      determining a time at which the manifest file indicates that at least a portion of the first segment is available;
      determining a multiple of the delta time value, the multiple being equal to a difference divided by the delta time value, the difference being between a first time and the time at which the manifest file indicates that the at least portion of the first segment is available;
      determining a number of chunks of the first segment that are available at the first time for retrieval using the multiple of the delta time value, wherein the number of chunks that are available at the first time is greater than zero and at least one chunk of the segment is not available at the first time;
      sending a first byte range request to a server device for the chunks of the first segment that are available at the first time, wherein the first byte range request specifies a byte range including the multiple times the value representing the minimum size of the data between the two random access points and omits chunks of the first segment that are not available at the first time including the at least one chunk of the first segment that is not available at the first time; and
      sending a second byte range request to the server device at a second time, later than the first time, for the at least one chunk of the first segment that was not available at the first time; and
   determining that the manifest file for the media presentation does not include data representing a resynchronization point for a second segment of the media presentation; and
   in response to determining that the manifest file for the media presentation does not include the data representing the resynchronization point for the second segment of the media presentation:
      determining a nominal segment availability start time (NSAST) for the second segment from the manifest file; and
      sending a request to retrieve the entire second segment at or after the NSAST for the second segment.

2. The method of claim 1, wherein the manifest file comprises a media presentation description (MPD).

3. The method of claim 1, wherein the delta time value comprises an @dT attribute for the first segment.

4. The method of claim 1, wherein the value representing the minimum size of data between two random access points comprises an @dImin value.

5. The method of claim 1, wherein the time at which the manifest file indicates that the at least portion of the first segment is available comprises a nominal segment availability start time (NSAST) for the first segment, and wherein determining the multiple comprises:
   determining an amount of time that has elapsed between the NSAST for the first segment and the first time; and
   determining the multiple as being equal to the amount of time that has elapsed divided by the delta time value.

6. The method of claim 1, wherein sending the request to retrieve the entire second segment comprises constructing the request to retrieve the entire second segment as an HTTP GET request that omits a "range:" header.

7. A device for transporting media data, the device comprising:
a memory configured to store media data; and
one or more processors implemented in circuitry and configured to:
determine that a manifest file for a media presentation includes data representing a delta time value and a value representing a minimum size of data between two random access points for a resynchronization element of a first segment of the media presentation;
in response to the determination that the manifest file for the media presentation includes the data representing the delta time value and the value representing the minimum size of data between two random access points for the resynchronization element of the first segment of the media presentation:
determine a time at which the manifest file indicates that at least a portion of the first segment is available;
determine a multiple of the delta time value, the multiple being equal to a difference divided by the delta time value, the difference being between a first time and the time at which the manifest file indicates that the at least portion of the first segment is available;
determine a number of chunks of the first segment that are available at the first time for retrieval using the multiple of the delta time value, wherein the number of chunks that are available at the first time is greater than zero and at least one chunk of the first segment is not available at the first time;
send a first byte range request to a server device for the chunks of the first segment that are available at the first time, wherein the first byte range request specifies a byte range including the multiple times the value representing the minimum size of the data between the two random access points and omits chunks of the first segment that are not available at the first time including the at least one chunk of the first segment that is not available at the first time;
send a second byte range request to the server device at a second time, later than the first time, for the at least one chunk of the first segment that was not available at the first time; and
store data of chunks received in response to the first and second byte range requests in the memory; and
determine that the manifest file for the media presentation does not include data representing a resynchronization point for a second segment of the media presentation; and
in response to the determination that the manifest file for the media presentation does not include the data the resynchronization point for the second segment of the media presentation:
determine a nominal segment availability start time (NSAST) for the second segment from the manifest file; and
send a request to retrieve the entire second segment at or after the NSAST for the second segment.

8. The device of claim 7, wherein the manifest file comprises a media presentation description (MPD).

9. The device of claim 7, wherein the delta time value comprises an @dT attribute for the first segment.

10. The device of claim 7, wherein the value representing the minimum size of data between two random access points comprises an @dImin value.

11. The device of claim 7, wherein the time at which the manifest file indicates that the at least portion of the first segment is available comprises a nominal segment availability start time (NSAST) for the first segment, and wherein to determine the multiple, the one or more processors are configured to:
determine an amount of time that has elapsed between the NSAST for the first segment and the first time; and
determine that the multiple is equal to the amount of time that has elapsed divided by the delta time value.

12. The device of claim 7, wherein the one or more processors are configured to construct the request to retrieve the entire second segment as an HTTP GET request that omits a "range:" header.

13. A non-transitory computer-readable storage medium having stored thereon instructions that, when executed, cause a processor to:
determine that a manifest file for a media presentation includes data representing a delta time value and a value representing a minimum size of data between two random access points for a resynchronization element of a first segment of the media presentation;
in response to the determination that the manifest file for the media presentation includes the data representing the delta time value and the value representing the minimum size of data between two random access points for the resynchronization element of the first segment of the media presentation:
determine a time at which the manifest file indicates that at least a portion of the first segment is available;
determine a multiple of the delta time value, the multiple being equal to a difference divided by the delta time value, the difference being between a first time and the time at which the manifest file indicates that the at least portion of the first segment is available;
determine a number of chunks of the first segment that are available at the first time for retrieval using the multiple of the delta time value, wherein the number of chunks that are available at the first time is greater than zero and at least one chunk of the first segment is not available at the first time; and
send a first byte range request to a server device for the chunks of the first segment that are available at the first time, wherein the first byte range request specifies a byte range including the multiple times the value representing the minimum size of the data between the two random access points and omits chunks of the first segment that are not available at the first time including the at least one chunk of the first segment that is not available at the first time; and
send a second byte range request to the server device at a second time, later than the first time, for the at least one chunk of the first segment that was not available at the first time; and
determine that the manifest file for the media presentation does not include data representing a resynchronization point for a second segment of the media presentation; and
in response to the determination that the manifest file for the media presentation does not include the data the resynchronization point for the second segment of the media presentation:

determine a nominal segment availability start time (NSAST) for the second segment from the manifest file; and send a request to retrieve the entire second segment at or after the NSAST for the second segment.

14. The non-transitory computer-readable storage medium of claim 13, wherein the manifest file comprises a media presentation description (MPD).

15. The non-transitory computer-readable storage medium of claim 13, wherein the delta time value comprises an @dT attribute for the first segment.

16. The non-transitory computer-readable storage medium of claim 13, wherein the value representing the minimum size of data between two random access points comprises an @dImin value.

17. The non-transitory computer-readable storage medium of claim 13, wherein the time at which the manifest file indicates that the at least portion of the first segment is available comprises a nominal segment availability start time (NSAST) for the first segment, and wherein the instructions that cause the processor to determine the multiple comprise instructions that cause the processor to:

determine an amount of time that has elapsed between the NSAST for the first segment and the first time; and determine the multiple as being equal to the amount of time that has elapsed divided by the delta time value.

18. The non-transitory computer-readable storage medium of claim 13, wherein the instructions that cause the processor to send the request to retrieve the entire second segment comprise instructions that cause the processor to construct the request to retrieve the entire second segment as an HTTP GET request that omits a "range:" header.

19. A device for transporting media data, the device comprising:

means for determining that a manifest file for a media presentation includes data representing a delta time value and a value representing a minimum size of data between two random access points for a resynchronization element of a first segment of the media presentation;

means for determining a time at which the manifest file indicates that at least a portion of the first segment is available in response to the determination that the manifest file for the media presentation includes the data representing the delta time value and the value representing the minimum size of data between two random access points for the resynchronization element of the first segment of the media presentation;

means for determining a multiple of the delta time value, the multiple being equal to a difference divided by the delta time value, the difference being between a first time and the time at which the manifest file indicates that the at least portion of the first segment is available in response to the determination that the manifest file for the media presentation includes the data representing the delta time value and the value representing the minimum size of data between two random access points for the resynchronization element of the first segment of the media presentation;

means for determining a number of chunks of the first segment that are available at the first time for retrieval using the multiple of the delta time value, wherein the number of chunks that are available at the first time is greater than zero and at least one chunk of the first segment is not available at the first time in response to the determination that the manifest file for the media presentation includes the data representing the delta time value and the value representing the minimum size of data between two random access points for the resynchronization element of the first segment of the media presentation;

means for sending a first byte range request to a server device for the chunks of the first segment that are available at the first time, wherein the first byte range request specifies a byte range including the multiple times the value representing the minimum size of the data between the two random access points and omits chunks of the first segment that are not available at the first time including the at least one chunk of the first segment that is not available at the first time;

means for sending a second byte range request to the server device at a second time, later than the first time, for the at least one chunk of the first segment that was not available at the first time in response to the determination that the manifest file for the media presentation includes the data representing the delta time value and the value representing the minimum size of data between two random access points for the resynchronization element of the first segment of the media presentation;

means for determining that the manifest file for the media presentation does not include data representing a resynchronization point for a second segment of the media presentation;

means for determining a nominal segment availability start time (NSAST) for the second segment from the manifest file in response to the determination that the manifest file for the media presentation does not include the data the resynchronization point for the second segment of the media presentation; and means for sending a request to retrieve the entire second segment at or after the NSAST for the second segment in response to the determination that the manifest file for the media presentation does not include the data the resynchronization point for the second segment of the media presentation.

20. The device of claim 19, wherein the manifest file comprises a media presentation description (MPD).

21. The device of claim 19, wherein the delta time value comprises an @dT attribute for the first segment.

22. The device of claim 19, wherein the value representing the minimum size of data between two random access points comprises an @dImin value.

23. The device of claim 19, wherein the time at which the manifest file indicates that the at least portion of the first segment is available comprises a nominal segment availability start time (NSAST) for the first segment, and wherein the means for determining the multiple comprises:

means for determining an amount of time that has elapsed between the NSAST for the first segment and the first time; and means for determining the multiple as being equal to the amount of time that has elapsed divided by the delta time value.

24. The device of claim 19, wherein the means for sending the request to retrieve the entire second segment comprises means for constructing the request to retrieve the entire second segment as an HTTP GET request that omits a "range:" header.

* * * * *